US009819555B2

(12) United States Patent
Tomizawa (10) Patent No.: US 9,819,555 B2
(45) Date of Patent: Nov. 14, 2017

(54) POLICY DESCRIPTION ASSISTANCE SYSTEM AND POLICY DESCRIPTION ASSISTANCE METHOD

(75) Inventor: Nobuyuki Tomizawa, Tokyo (JP)

(73) Assignee: NEC Corporation, Tokyo (JP)

( * ) Notice: Subject to any disclaimer, the term of this patent is extended or adjusted under 35 U.S.C. 154(b) by 198 days.

(21) Appl. No.: 14/113,373

(22) PCT Filed: Feb. 15, 2012

(86) PCT No.: PCT/JP2012/053539
§ 371 (c)(1),
(2), (4) Date: Oct. 22, 2013

(87) PCT Pub. No.: WO2012/144257
PCT Pub. Date: Oct. 26, 2012

(65) Prior Publication Data
US 2014/0052858 A1 Feb. 20, 2014

(30) Foreign Application Priority Data

Apr. 22, 2011 (JP) .................................. 2011-095703

(51) Int. Cl.
*H04L 12/26* (2006.01)
*H04L 12/24* (2006.01)
*G06F 11/30* (2006.01)

(52) U.S. Cl.
CPC .......... *H04L 43/00* (2013.01); *G06F 11/3065* (2013.01); *H04L 41/0893* (2013.01); *H04L 43/08* (2013.01)

(58) Field of Classification Search
CPC .... H04L 29/08072; H04L 29/06; H04L 43/00
(Continued)

(56) References Cited

U.S. PATENT DOCUMENTS 4,803,039 A * 2/1989 Impink, Jr. .......... G05B 19/409
376/216
6,578,077 B1 * 6/2003 Rakoshitz ........... H04L 12/2602
709/224
(Continued)

FOREIGN PATENT DOCUMENTS

JP 61-202230 9/1986
JP 09-006620 1/1997
(Continued)

OTHER PUBLICATIONS

Kato, K. et al., "Jiritsu Un'yo Kanri ni Muketa Settei Joho Kanri Shuho ni Kansuru Ichi Kosatsu", Dai 69 Kai (Heisei 19 Nen) Zenkoku Taikai Koen Ronbunshu (1), Mar. 6, 2007, 4 pages.
(Continued)

*Primary Examiner* — Nicholas Taylor
*Assistant Examiner* — Chong G Kim
(74) *Attorney, Agent, or Firm* — Wilmer Cutler Pickering Hale and Dorr LLP (57) ABSTRACT

An object of the present invention is to assist in describing policies so that errors when describing policies are reduced. The present invention includes: referring to a parameter information storage unit that stores a plurality of parameters for a monitoring target system, and displaying the plurality of parameters on a screen of a display device; referring to a policy information storage unit that stores a plurality of policies in which a condition including at least one parameter of the plurality of parameters and a process executed when the condition is satisfied are described, displaying the plurality of policies on the screen, and adding or modifying a policy in the policy information storage unit according to a user input; dynamically determining association between the plurality of parameters stored in the parameter information storage unit and the plurality of policies stored in the policy information storage unit; and displaying the associa-
(Continued)

tion between the plurality of parameters and the plurality of policies on the screen in an identifiable manner based on the determination results.

8 Claims, 6 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 8,494,977 | B1* | 7/2013 | Yehuda | G06Q 10/00 706/11 |
| 2002/0077711 | A1* | 6/2002 | Nixon | C10G 11/187 700/51 |
| 2002/0083169 | A1* | 6/2002 | Aki | H04L 12/2602 709/224 |
| 2002/0183972 | A1* | 12/2002 | Enck | G06F 11/3409 702/186 |
| 2003/0107590 | A1* | 6/2003 | Levillain | H04L 29/06027 715/736 |
| 2004/0059808 | A1* | 3/2004 | Galloway | G06N 5/02 709/224 |
| 2004/0210418 | A1* | 10/2004 | Fukuda | G06F 11/3442 702/182 |
| 2004/0243699 | A1* | 12/2004 | Koclanes | H04L 29/06 709/224 |
| 2005/0125688 | A1* | 6/2005 | Ogawa | H04L 43/0835 726/1 |
| 2007/0136269 | A1* | 6/2007 | Yamakabe | H04L 67/2823 |
| 2007/0169167 | A1* | 7/2007 | Morimura | G06F 21/6218 726/1 |
| 2008/0120406 | A1* | 5/2008 | Ahmed | G06F 11/3414 709/224 |
| 2008/0162452 | A1* | 7/2008 | Cox | H04L 41/0893 |
| 2008/0228755 | A1* | 9/2008 | Haga | G06F 11/008 |
| 2008/0295095 | A1* | 11/2008 | Watanabe | G06F 11/0712 718/1 |
| 2009/0132458 | A1* | 5/2009 | Edwards | G06N 5/025 706/50 |
| 2009/0177512 | A1* | 7/2009 | Dogan | G06Q 10/06 726/1 |
| 2009/0177929 | A1* | 7/2009 | Sijelmassi | G06F 11/0709 714/47.2 |
| 2009/0182866 | A1* | 7/2009 | Watanabe | G06F 11/3495 709/224 |
| 2009/0216624 | A1* | 8/2009 | Kato | G06F 11/3409 705/7.38 |
| 2009/0299936 | A1* | 12/2009 | Kikuchi | G06F 21/604 706/46 |
| 2010/0132010 | A1* | 5/2010 | Chatterton | H04L 67/12 726/1 |
| 2012/0005609 | A1* | 1/2012 | Ata | G06F 11/0709 715/771 |
| 2012/0102542 | A1* | 4/2012 | Kobayashi | G06Q 10/0635 726/1 |
| 2012/0233316 | A1* | 9/2012 | Nakajima | G06F 11/3034 709/224 |
| 2012/0284628 | A1* | 11/2012 | Wong | H04L 67/306 715/736 |
| 2013/0311193 | A1* | 11/2013 | Know | G06Q 50/22 705/2 |
| 2014/0040454 | A1* | 2/2014 | Ramsey | G06F 9/542 709/224 |

FOREIGN PATENT DOCUMENTS

| | | |
|---|---|---|
| JP | 2007-041677 | 2/2007 |
| JP | 2007-087232 | 4/2007 |
| JP | 2009-169657 | 7/2009 |
| WO | WO-2008/114355 | 9/2008 |

OTHER PUBLICATIONS

International Search Report corresponding to PCT/JP2012/053539, dated Mar. 6, 2012, 3 pages.

* cited by examiner

FIG. 1

PARAMETER INFORMATION STORAGE UNIT    22

| NAME | DATA TYPE | RANGE | PRESENT VALUE |
|---|---|---|---|
| Transactions | Float | [0.0, 10000] | 300 |
| LoadAverage | Float | [0.0, 10.0] | 6.0 |
| NumTotalMachines | Int | [0, 10] | 3 |
| NumDeadMachines | Int | [0, 10] | 1 |
| ⋮ | ⋮ | ⋮ | ⋮ |

110 → Transactions
112 → LoadAverage
114 → NumTotalMachines
116 → NumDeadMachines

100 NAME, 102 DATA TYPE, 104 RANGE, 106 PRESENT VALUE

```
                                                                    ┌─120
Declaration{} // ADD MACHINE IN HEAVY LOAD STATE
Policy {
  Condition { LoadAverage > 5.0 }
  Decision { NumTotalMachines < 10 -> AddMachines(1) }
}:1
```

P002

```
                                                                    ┌─122
Declaration{} // REMOVE MACHINE IN LIGHT LOAD STATE
Policy {
  Condition { LoadAverage > 5.0 }
  Decision { NumTotalMachines > 1 -> DelMachines(1) }
}:1
```

P003

```
                                                                    ┌─124
Declaration{
  Macro {
    Name IsMachinesAvairable; Type Boolean;
    Procedure = NumAliveMachines < 10
  }
}
Policy {
  Condition { LoadAverage > 5.0 }
  Decision { IsMachinesAvairable -> AddMachines(1) }
}:1
```

POLICY DESCRIPTION ASSISTANCE SYSTEM AND POLICY DESCRIPTION ASSISTANCE METHOD

CROSS-REFERENCE TO RELATED APPLICATIONS

This application is a national stage application of International Application No. PCT/JP2012/053539 entitled "Policy Description Assistance System and Policy Description Assistance Method," filed on Feb. 15, 2012, which claims the benefit of the priority of Japanese patent application No. 2011-095703, filed on Apr. 22, 2011, the disclosures of each of which are hereby incorporated by reference in their entirety.

BACKGROUND

The present invention relates to a policy description assistance system and a policy description assistance method.

A management method using a policy-based management technique is widely known as a technique for optimizing operational management of large-scale networks and systems. The policy-based management technique automates processes to be executed according to the state of a network or a system using a set of policies, such as if-then rules, which associates a condition and an operation when the condition is satisfied.

Naturally, in the policy-based management technique, the correctness of policy description is very important. This is because errors in policy description have an adverse effect on a network or a system that actually operates.

On the other hand, although descriptions based on the if-then rule are, by themselves, easy to understand, it is difficult to understand existing rules and to describe or add new rules when a plurality of if-then rules affects each other. This is because in general sequential programs, a change occurring from a certain state during execution of a program is restricted to a certain location on the program sentence, whereas in the if-then rules, immediately after execution of the then clause, all rules can be a potential object that is executed next. Thus, it is difficult to understand whether the order of rules executed is described as intended.

As one method for dealing with such a problem, a formal verification technique has been applied to policies that have been described. For example, Patent Documents 1 and 2 disclose a software verification technique based on logical formulas of policies and a technique called model checking (see E. M. Clarke, O. Grumberg, and D. A. Peled, Model Checking, The MIT Press, 1999, and the like), respectively, so as to enable validity of described policies to be checked. Moreover, Patent Document 3 discloses a technique of making it easy to modify policy rules when changing system configuration. Further, Patent Document 4 discloses a monitoring technique of illustrating association between rules. For example, in a system that executes description of general if-then rules, a condition part (if clause) and a conclusion part (then clause) that satisfies the condition part can be displayed hierarchically by linking both parts by a line. Moreover, a rule that is executed by satisfying a condition and a rule that is affected by execution of the conclusion part of the rule can be displayed by connecting both rules by a line.

Patent Document 1: Patent Publication JP-A-2007-41677
Patent Document 2: WO 2008/114355
Patent Document 3: Patent Publication JP-A-2007-87232
Patent Document 4: Patent Publication JP-A-61-202230

SUMMARY

However, the techniques disclosed in Patent Documents 1 and 2 can enable verification only in such a strict state that a pair of a checking target policy and a checking rule is perfectly defined. In other words, although it is possible to mechanically verify whether a policy that has been described satisfies a strict condition defined by a logical formula, it is not possible to determine whether description of a policy is imperfect in the stage of describing a policy, for example. Moreover, this technique cannot be applied when the operation of writing the content to be verified in a logical formula is difficult because the user is in the stage of changing policy description, for example.

Moreover, the technique disclosed in Patent Document 3 allows users to determine the influence of a change in description of a policy rule by additionally describing the reasons for applying the policy rule when creating the policy rule. That is, this technique originally aims to specify the influence of modification of policy rules during operation. Thus, it is necessary to additionally describe the reasons for application in addition to the policy rules themselves, and it is difficult to apply this technique because it takes time and effort in particular in the initial stage of creating policy rules.

Moreover, in the technique disclosed in Patent Document 4, the condition part (if clause) and the conclusion part (then clause) that satisfies the condition part are displayed hierarchically in a statically determined structure by linking both parts by a line. After that, the if-then rule is executed in a designated initial state. Thus, it is difficult to perform checking simultaneously with editing of rules. Further, since a display format of rules is different from that under editing, it is difficult to check which rule is to be executed simultaneously with the operation of adding and modifying rules. Furthermore, in the technique disclosed in Patent Document 4, it is assumed that a boolean value called "Initial Status" that externally affects the truth of a condition part and a boolean value (a character string indicating the boolean value) of which value is determined to be true by the conclusion part are all simple boolean values. That is, Patent Document 4 does not discloses a technique of enabling rules to be monitored when a rule includes a plurality of conditions having different threshold values, such as "exceeds 50% of communication capacity" or "exceeds 70% of communication capacity," for parameters, such as traffic or a CPU load, the observed values of which change continuously.

With the foregoing in view, it is an object of the present invention to assist in describing policies so that errors when describing policies are reduced.

A policy description assistance system according to an aspect of the present invention includes: a parameter display unit configured to refer to a parameter information storage unit storing a plurality of parameters for a monitoring target system, and display the plurality of parameters on a screen of a display device; a policy display unit configured to refer to a policy information storage unit storing a plurality of policies in which a condition including at least one parameter of the plurality of parameters and a process executed when the condition is satisfied are described, the policy display unit displaying the plurality of policies on the screen, and adding or modifying a policy in the policy information storage unit according to a user input; an association determining unit configured to dynamically determine association between the plurality of parameters stored in the parameter information storage unit and the plurality of policies stored in the policy information storage unit; and an association display unit configured to display the association between the plurality of parameters and the plurality of policies on the screen in an identifiable manner based on determination results of the association determining unit.

In the present invention, a "unit" does not simply mean physical means but includes a case where the function of the "unit" is realized by software. Moreover, the function of one "unit" or device may be realized by two or more physical means or devices, and the functions of two or more "units" or devices may be realized by one physical means or device.

According to the present invention, it is possible to assist in describing policies so that errors when describing policies are reduced.

DETAILED DESCRIPTION

Hereinafter, an embodiment of the present invention will be described with reference to the drawings.

==Configuration==

Figure 1:
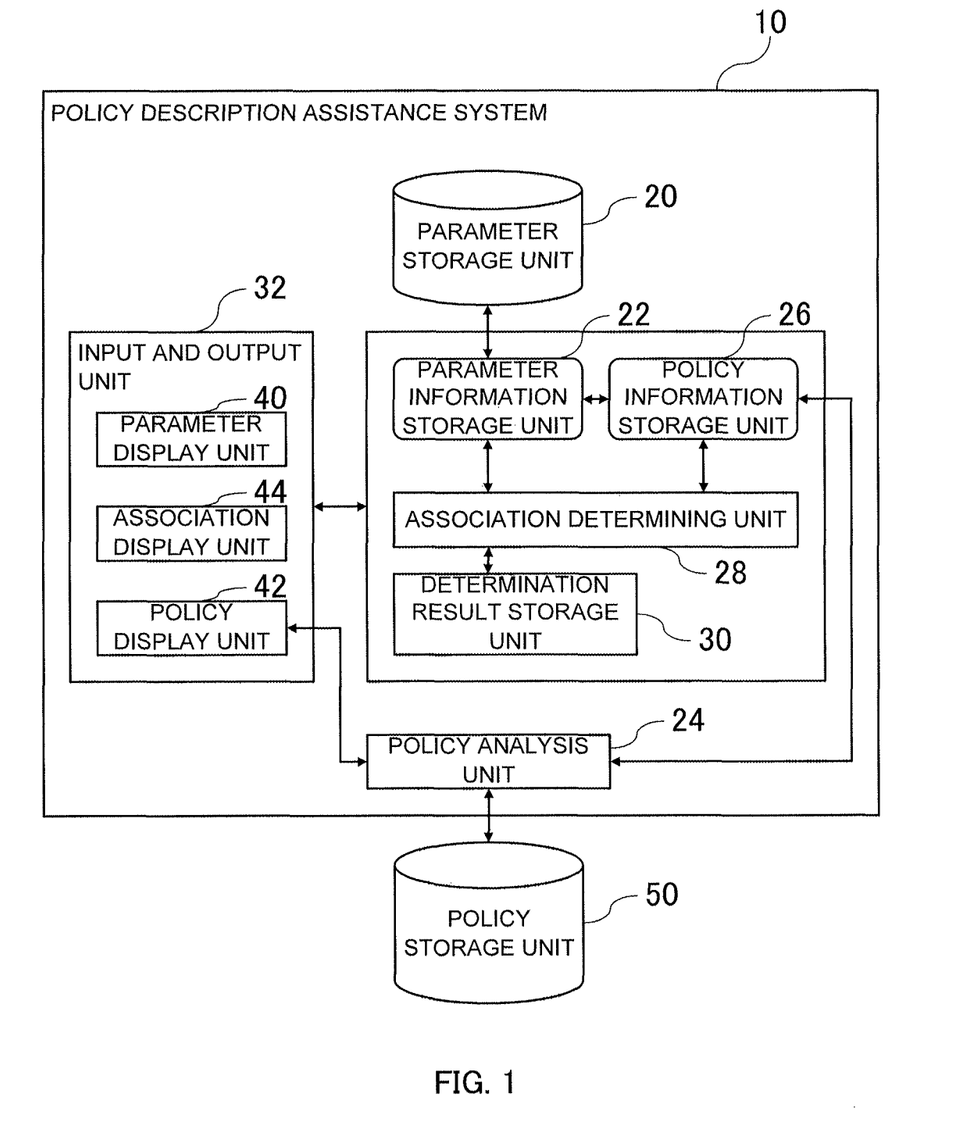
FIG. 1 is a diagram showing a configuration of a policy description assistance system according to an embodiment of the present invention.

First, a system configuration will be described. FIG. 1 is a diagram showing a configuration of a policy description assistance system according to an embodiment of the present invention. The policy description assistance system 10 is an information processing system for assisting a monitoring target system in describing policies and includes one or a plurality of information processing devices. Here, a policy defines a condition and a process (event) corresponding to the condition, and in the present embodiment, is described by an if-then rule.

As shown in FIG. 1, the policy description assistance system 10 includes a parameter storage unit 20, a parameter information storage unit 22, a policy analysis unit 24, a policy information storage unit 26, an association determining unit 28, a determination result storage unit 30, and an input and output unit 32. Moreover, the input and output unit 32 includes a parameter display unit 40, a policy display unit 42, and an association display unit 44. The parameter storage unit 20, the parameter information storage unit 22, the policy analysis unit 24, the policy information storage unit 26, the association determining unit 28, the determination result storage unit 30, and the input and output unit 32 can be realized by using a storage area of a memory or a storage device and by a processor executing a program stored in the storage area.

The parameter storage unit 20 stores parameters that are to be monitored, of the monitoring target system. In the present embodiment, the parameters stored in the parameter storage unit 20 are temporarily read into the parameter information storage unit 22 as parameter information during policy description assistance. The parameter storage unit 20 may be provided outside the policy description assistance system 10. Moreover, the parameter information read into the parameter information storage unit 22 may be the parameter itself stored in the parameter storage unit 20 and may be one obtained by converting the format or the like of the parameter or extracting a part of the parameter.

Figure 2:
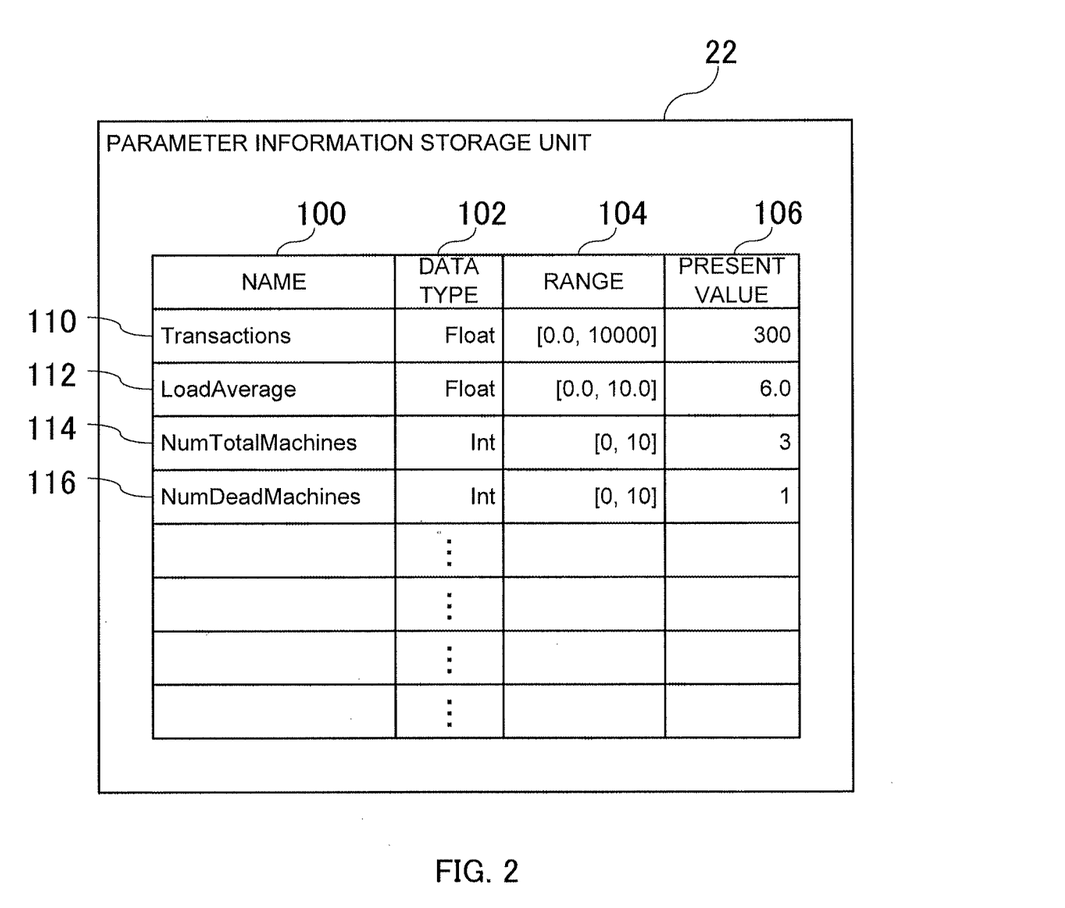
FIG. 2 is a diagram showing an example of the structure of a parameter information storage unit.

FIG. 2 is a diagram showing an example of the structure of the parameter information storage unit 22. The parameter information virtually represents the state of the monitoring target system and includes a name 100, a data type 102, a range 104, and a present value 106. Such parameter information can be configured by various methods such as a CVS (comma separated value) file or an SQL database, for example. The format of a parameter value such as Float (floating point) or Int (integer) is set in the data type 102. The range 104 indicates a range that the parameter value can take. A value designated by the user using the input and output unit 32 is held in the present value 106.

Returning to FIG. 1, the policy analysis unit 24 performs syntactic analysis and semantic analysis on the policies stored in a policy storage unit 50 and policies added or modified on the policy display unit 42, converts the policies into policy information, and stores the policy information in the policy information storage unit 26. For example, policies are described in accordance with a predetermined grammar such as CIM-SPL (Common Information Model-Simplified Policy Language) standardized by DMTF (Distributed Management Task Force). Moreover, the policy analysis unit 24 converts policies added or modified on the policy display unit 42 into policy information and stores the policy information in the policy information storage unit 26. Further, the policy analysis unit 24 can also convert the policies added or modified on the policy display unit 42 into a predetermined format and store the converted policies in the policy storage unit 50.

Figure 3:
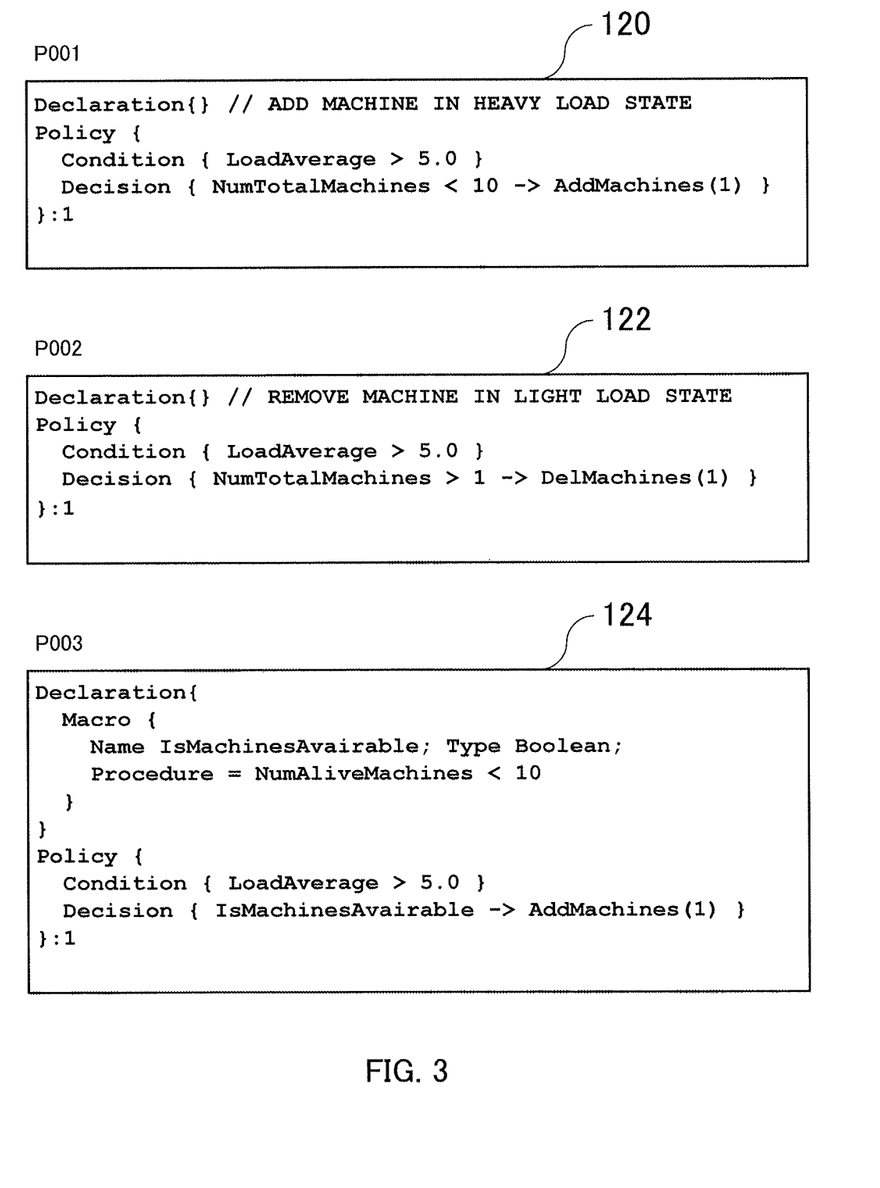
FIG. 3 is a diagram showing examples of policies.

FIG. 3 is a diagram showing examples of policies. Three policies shown in FIG. 3 are described in CIM-SPL, in which the part following "Condition" is a condition part (if clause), and the part following "Decision" is an execution part (then clause). Such a policy can be stored in the policy storage unit 50 by various methods such as a CSV file or an SQL database, for example. The policies stored in the policy storage unit 50 may have an optional format as long as the name and the description content of the policy can be identified.

Figure 4:
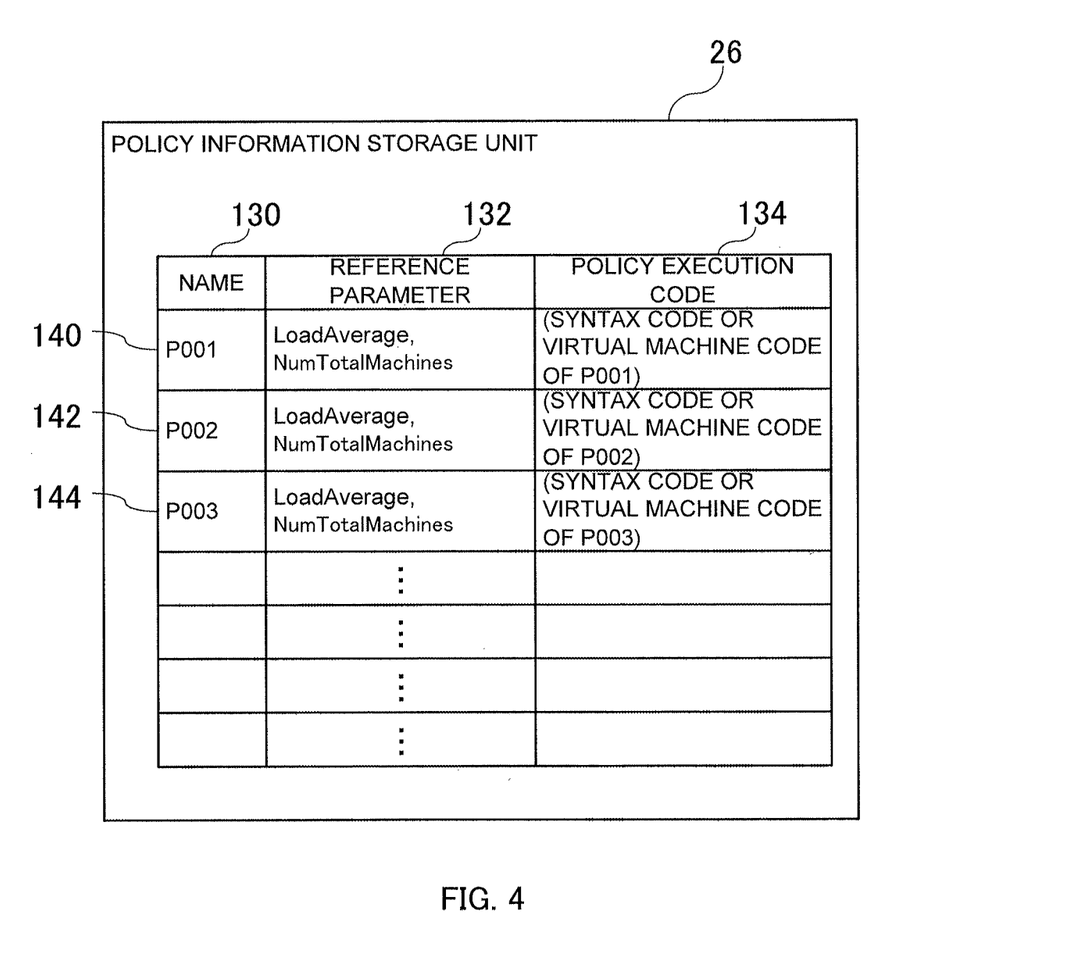
FIG. 4 is a diagram showing an example of the structure of a policy information storage unit.

FIG. 4 is a diagram showing an example of the structure of the policy information storage unit 26. The policy information is an internal representation obtained by the policy analysis unit 24 analyzing the policy described in accordance with a predetermined language and includes a name 130, a reference parameter 132, and a policy execution code 134. The names of parameters referenced in the condition part (if clause) of each policy is set in the reference parameter 132. Moreover, information on codes executed in each policy is stored in the policy execution code 134. For example, a syntax tree or a virtual machine code of the policy can be used as the policy execution code.

Returning to FIG. 1, the association determining unit 28 determines association between parameters and policies based on the parameter information stored in the parameter information storage unit 22 and the policy information stored in the policy information storage unit 26 and stores the determination results in the determination result storage unit 30. When policy information is added or modified according to an input from the policy display unit 42, the association determining unit 28 determines association between parameters and policies again. That is, the association determining unit 28 dynamically determines association between parameters and policies. Here, association between parameters and policies indicates, for example, whether each parameter is used in each policy and whether the condition of each policy is satisfied by the present value of each parameter.

The input and output unit 32 is a graphical user interface (GUI) for describing policies and is configured to receive a user input from an input device such as a keyboard or a mouse and display a screen on a display device such as a display.

The parameter display unit 40 displays the parameter information stored in the parameter information storage unit 22 on the screen provided by the input and output unit 32. Moreover, the parameter display unit 40 is configured to receive a user input for adding and modifying the parameter information on the screen.

The policy display unit 42 displays the policy information stored in the policy information storage unit 26 on the screen provided by the input and output unit 32. Moreover, the policy display unit 42 is configured to receive a user input for adding and modifying the policy information on the screen.

The association display unit 44 displays association between parameters and policies on the screen provided by the input and output unit 32 based on the determination results stored in the determination result storage unit 30.

Figure 5:
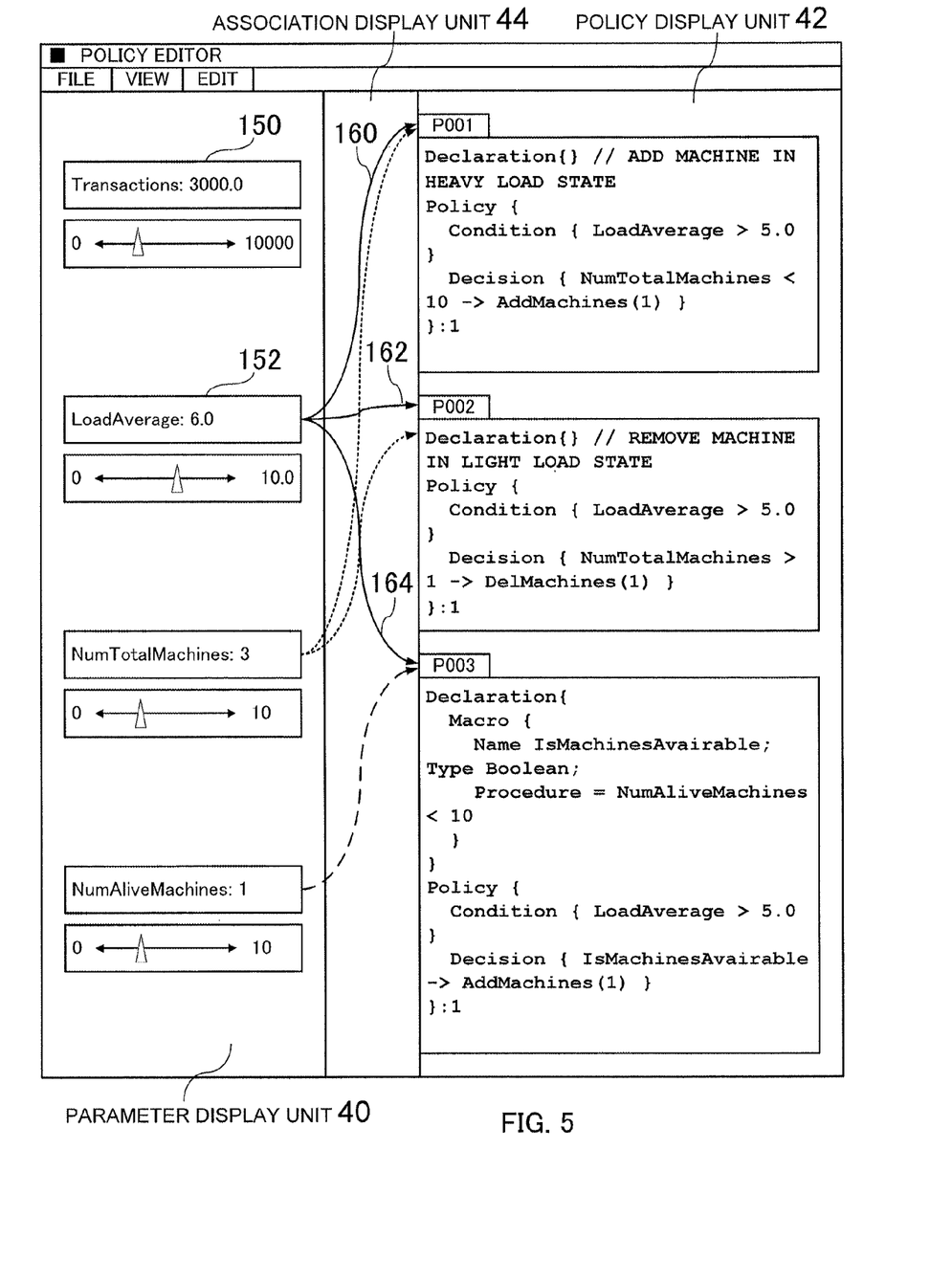
FIG. 5 is a diagram showing an example of a screen provided by an input and output unit.

FIG. 5 is a diagram showing an example of a screen provided by the input and output unit 32. As shown in FIG. 5, the screen includes a region in which the parameter information is displayed by the parameter display unit 40, a region in which the policy information is displayed by the policy display unit 42, and a region in which the association between parameters and policies is displayed by the association display unit 44.

In the example of FIG. 5, the parameter display unit 40 displays names and present values of the parameters stored in the parameter information storage unit 22 and displays an operating unit for changing the present values of parameters within their ranges. The parameter display unit 40 can change the present values of parameters by receiving the operation on the operating unit. The policy display unit 42 displays the names and the description contents of policies based on the policy information stored in the policy information storage unit 26. Moreover, the policy display unit 42 can receive a user input for changing the policy description on the screen. The association display unit 44 displays association between parameters displayed on the parameter display unit 40 and policies displayed on the policy display unit 42.

For example, when there is a parameter used in the condition part of a policy, the association display unit 44 displays association between the policy and the parameter by displaying a line that connects the policy and the parameter. Further, for example, when there is a policy of which condition is satisfied by the present value of a parameter, the association display unit 44 displays association between the policy and the parameter by highlighting a line that connects the policy and the parameter. Here, the association display unit 44 may display the lines so that the display mode of the line representing whether a parameter is used or not is different from the display mode of the line representing that the condition of a policy is satisfied. For example, the line representing whether a parameter is used or not may be displayed as a normal line, and the line representing that the condition of a policy is satisfied may be displayed as a blinking line. The display mode for displaying the association between policies and parameters is not limited to a line that connects both, but an optional method can be used as long as the association can be identified. Moreover, a highlighting method when the condition of a policy is satisfied is not limited to the blinking display, but an optional display mode can be used.

==Operation==

Figure 6:
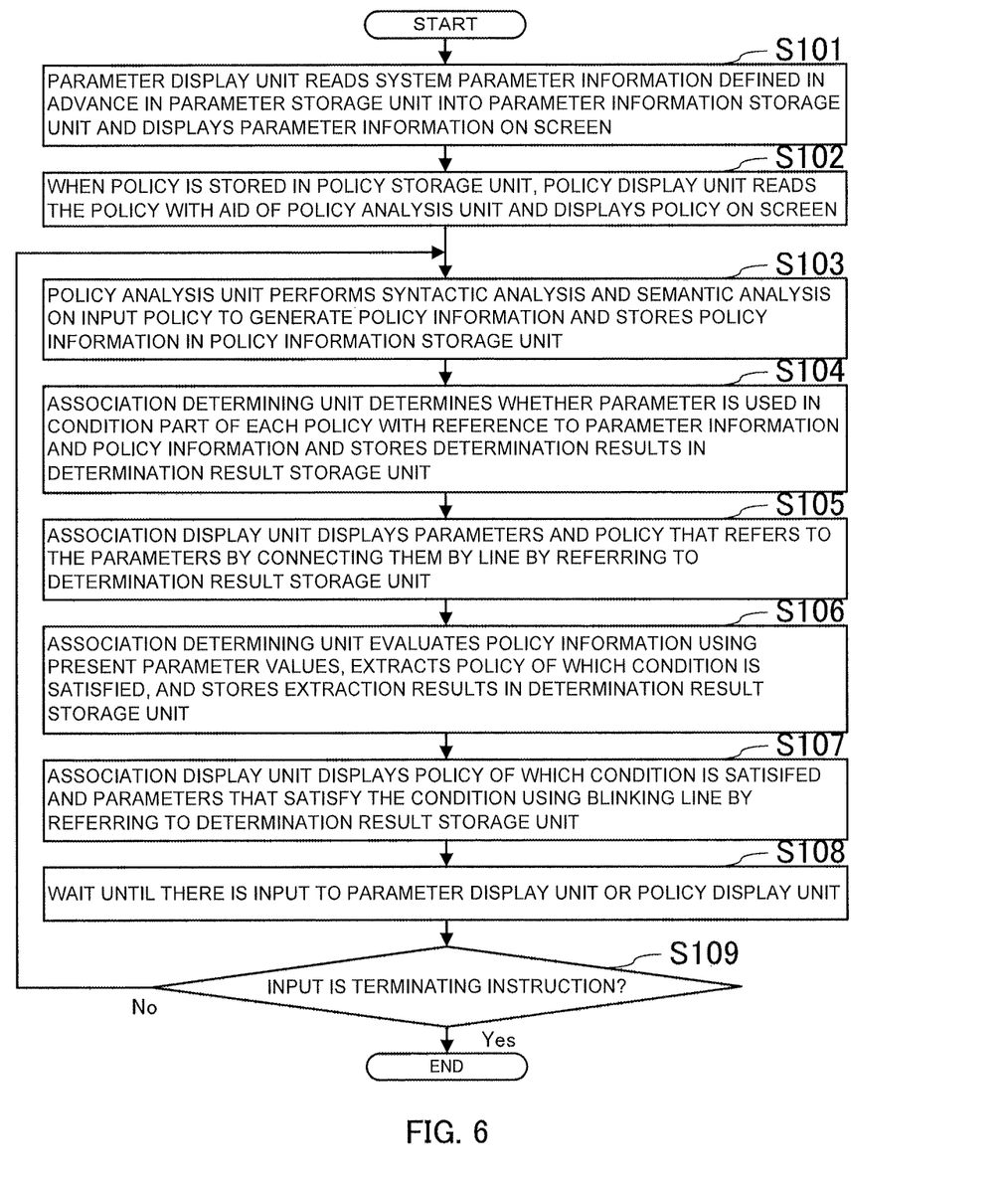
FIG. 6 is a flowchart showing an example of an operation of a policy description assistance system.

Next, the operation of the policy description assistance system 10 will be described. FIG. 6 is a flowchart showing an example of the operation of the policy description assistance system 10. First, the parameter display unit 40 reads system parameter information defined in advance in the parameter storage unit 20 into the parameter information storage unit 22 and displays the parameter information on a screen (S101). Moreover, when there is a policy stored in the policy storage unit 50, the policy display unit 42 reads the policy with the aid of the policy analysis unit 24 and displays the policy on the screen (S102). Moreover, the policy analysis unit 24 performs syntactic analysis and semantic analysis on the description of the read policy to generate policy information and stores the policy information in the policy information storage unit 26 (S103). As described above, the policy information includes the names of system parameters referenced by the policy in addition to information necessary for execution of the policy.

The association determining unit 28 determines whether a parameter is used in the condition part of each policy with reference to the parameter information and the policy information and stores the determination results in the determination result storage unit 30 (S104). Moreover, the association display unit 44 displays parameters and a policy that refers to the parameters by connecting them by a line by referring to the determination result storage unit 30 (S105). As described above, the display mode of representing the association between parameters and policies is not limited to a line that connects both, but an optional display mode can be used.

Further, the association determining unit 28 evaluates the policy information using the present parameter values, extracts a policy of which condition is satisfied, and stores the extraction results in the determination result storage unit 30 (S106). Moreover, the association display unit 44 highlights the line that connects the policy of which condition is satisfied, extracted by the association determining unit 28 and parameters that satisfy the condition using a "blinking line," for example, by referring to the determination result storage unit 30 (S107).

By the processes above, the input policy description is displayed in association with parameters referenced, and when the present parameter value satisfies the condition of a policy, the parameter and the policy are displayed in association in a different display mode. Thus, the operation is temporarily stopped until there is an input to the parameter display unit 40 or the policy display unit 42 (S108). When the input is a certain terminating instruction (S109: Yes), the operation is completed. On the other hand, when the parameter value of a GUI component displayed by the parameter display unit 40 is changed, or a policy description is input to a GUI component displayed by the policy display unit 42 (S109: No), the flow returns to step S103, the process is repeated from the step in which the policy analysis unit 24 performs syntactic analysis and semantic analysis on the input policy.

In this manner, when a parameter value is changed, the association between parameter and policies can be displayed according to the changed value. For example, when the condition of a policy is satisfied as the result of a change in the parameter value, the line that connects the parameter and the policy is changed to a blinking line. Thus, it is possible to easily understand which policy will be executed as the result of a change in the parameter value. Moreover, when the policy description is changed, a referenced parameter is displayed as a dot line according to the changed description content. Further, a policy of which condition is satisfied by the present parameter value is displayed as a blinking line. Thus, it is possible to easily understand which policy is changed so as to reference which parameter and whether a policy will be executed or not.

An example of the operation of the policy description assistance system 10 will be described with reference to a specific example. First, the parameter display unit 40 reads system parameter information defined in advance in the parameter storage unit 20 into the parameter information storage unit 22 and displays the parameter information on a screen (S101). In this example, as shown in FIG. 2, it is assumed that four parameters of "Transactions" 110, "LoadAverage" 112, "NumTotalMachine" 114, and "NumDeadMachines" 116 are defined as parameters. These parameters represent "amount of system transactions," "system load average," "total number of system machines," and "number of dead machines in system," respectively. Moreover, these parameters have data types Float (floating point), Float, Int (integer), and Int, respectively. Further, the ranges that these parameters can take are set to "0.0 to 1000.0," "0.0 to 10.0," "0 to 10," and "0 to 10," respectively. Furthermore, a value designated by a user with the aid of the parameter display unit 40 is held in "present value" of the parameter information, and in the example of FIG. 2, "300," "6.0," "3," and "1" are held for the respective parameters.

Subsequently, the policy display unit 42 reads policies stored in the policy storage unit 50 with the aid of the policy analysis unit 24 and displays the policies on the screen (S102). In this example, it is assumed that three policies "P001" 120, "P002" 122, and "P003" 124 shown in FIG. 3 are stored in the policy storage unit 50. Moreover, the policy analysis unit 24 performs syntactic analysis and semantic analysis on the input policies to generate policy information 140, 142, and 144 as shown in FIG. 4, and stores the same in the policy information storage unit 26 (S103). As shown in FIG. 4, the names of parameters referenced by the respective policy descriptions are held in the column of the reference parameter 132 as the analysis results of the policy analysis unit 24. Moreover, the analysis results obtained by the policy analysis unit 24 analyzing the respective policies are stored in the column of the policy execution code 134 in such a format that the association determining unit 28 can easily evaluate the policies. For example, an intermediate format of an interpreter such as a syntax tree or a virtual machine code can be used as the policy execution code.

The association determining unit 28 determines whether a parameter is used in the condition part of each policy with reference to the parameter information and the policy information and stores the determination results in the determination result storage unit 30 (S104). Moreover, the association display unit 44 visualizes which parameter has influence on execution of which policy by displaying lines so as to be connected between the four parameters displayed by the parameter display unit 40 and the three policies displayed by the policy display unit 42 as shown in FIG. 5 by referring to the determination result storage unit 30 when there is a parameter referenced by each policy (S105). For example, as shown in FIG. 5, no policy is associated with the parameter "Transactions" 150. That is, in the present policy descriptions, it can be understood that a change in the amount of system transactions does not have any influence on execution of the policies. On the other hand, the parameter "LoadAverage" 152 is associated with three policies, and it can be understood that there is a possibility that the respective policies may be executed according to a change in "system load average."

Further, the association determining unit 28 evaluates the policy information using the present parameter values, extracts a policy of which condition is satisfied, and stores the extraction results in the determination result storage unit 30 (S106). Moreover, the association display unit 44 highlights the line that connects the policy of which condition is satisfied, extracted by the association determining unit 28 and parameters that satisfy the condition using a "blinking line" by referring to the determination result storage unit 30 (S107). For example, as shown in FIG. 5, it is assumed that the present parameters have values of 3000.0 for "Transactions," 6.0 for "LoadAverage," 3 for "NumTotalMachines," and 1 for "NumDeadMachines." In this case, since all policies satisfy the condition "LoadAverage>5.0," the lines 160, 162, and 164 drawn from the parameter "LoadAverage" to the respective policies are displayed as blinking lines.

When the processes above are completed, the policy description assistance system 10 temporarily enters an input standby state (S108).

Here, it is assumed that the policy "P002" 122 shown in FIG. 3 is intended to perform "remove machine in light load state" (specifically, the policy operates when the LoadAverage value is small). However, as shown in FIG. 3, the condition part is erroneously described as "LoadAverage>5.0" like other policies so that the policy operates when the "LoadAverage" value is large. Thus, a case where the user performs operations to modify this error on the policy display unit 42 will be considered. For example, it is assumed that the user modifies the condition "LoadAverage>5.0" of the policy "P002" 122 to "LoadAverage<0.5." Since this input is not a system terminating operation (S109: No), the processes starting from step S103 are executed again based on this input.

That is, the policy analysis unit 24 analyzes the changed policy again and updates the policy information storage unit 26 (S103). Even after analysis, since there is no change in the types of referenced parameters, there is no change in the positions of the connecting lines 160, 162, and 164 (S105). However, although the parameter values are not changed, since the description of the policy condition is changed, the evaluation results are different. Specifically, the policies "P001" and "P003" are extracted as policies of which condition is satisfied by the present "LoadAverage" value 6.0 (S106).

As a result, the lines 160 and 164 between the parameter "LoadAverage" and the two policies "P001" and "P003" are displayed as blinking lines (S107). On the other hand, the line 162 between the parameter "LoadAverage" and the policy "P002" is changed from a blinking line to a normal line. In this manner, the user can check that a policy which was not intended to be executed but was erroneously described to be executed has been correctly modified so as not to be executed simultaneously with a policy editing operation by modifying the policy "P002."

Further, it is assumed that the user changes the parameter "LoadAverage" value to 0.3, for example, by operating a GUI component of the parameter "LoadAverage" on the parameter display unit 40 in order to check that the changed policy "P002" will be executed in a light load state as intended. Since this input is not a terminating operation (S109: No), the processes starting from step S103 are executed again according to a change in the parameter value. In this case, since there is no change in the policy description, the policy information is not changed (S103). On the other hand, since the parameter "LoadAverage" value is changed from 6.0 to 0.3, only the policy "P002" is extracted as a policy of which condition is satisfied.

As a result, the lines 160 and 164 between the parameter "LoadAverage" and the policies "P001" and "P003" are displayed as normal lines, and the line 162 between the parameter "LoadAverage" and the policy "P002" is displayed as a blinking line. In this manner, the user can easily check that only the policy "P002" operates in such a light load state that the parameter "LoadAverage" is 0.5, and that as a result, the operation of the entire policy description is as intended.

Hereinabove, the policy description assistance system 10 according to the present embodiment has been described. According to the present embodiment, it is possible to easily understand association between parameters and policies while interactively changing the parameters and policies of the monitoring target system. Specifically, the user can understand which parameter has influence on the condition part (if clause) of which policy, and which policy has the condition that is satisfied by the present parameter value such that the conclusion part (then clause) is executed. Thus, it is possible to assist in describing policies so that errors when describing policies are reduced.

The present invention is provided to facilitate understanding of the present invention and is not to be construed as limiting the present invention. The present invention can be changed or altered without departing from its spirit and encompass equivalents thereof.

This application is based upon and claims the benefit of priority from the prior Japanese Patent Application No. 2011-95703 filed on Apr. 22, 2011, the disclosure of which is incorporated herein in its entirety by reference.

While the invention has been particularly shown and described with reference to exemplary embodiments thereof, the invention is not limited to these embodiments. It will be understood by those skilled in the art that various changes in form and details may be made therein without departing from the spirit and scope of the present invention.

Part or all of the present embodiments may be described as the following supplementary notes, and the present invention is not limited to this.

(Supplementary Note 1)

A policy description assistance system including: a parameter display unit configured to refer to a parameter information storage unit storing a plurality of parameters for a monitoring target system, and display the plurality of parameters on a screen of a display device; a policy display unit configured to refer to a policy information storage unit storing a plurality of policies in which a condition including at least one parameter of the plurality of parameters and a process executed when the condition is satisfied are described, the policy display unit displaying the plurality of policies on the screen, and adding or modifying a policy in the policy information storage unit according to a user input; an association determining unit configured to dynamically determine association between the plurality of parameters stored in the parameter information storage unit and the plurality of policies stored in the policy information storage unit; and an association display unit configured to display the association between the plurality of parameters and the plurality of policies on the screen in an identifiable manner based on determination results of the association determining unit.

(Supplementary Note 2)

The policy description assistance system according to Supplementary Note 1, wherein the parameter display unit is further configured to add or modify a parameter in the parameter information storage unit according to a user input.

(Supplementary Note 3)

The policy description assistance system according to Supplementary Note 1 or 2, wherein the association display unit is configured to display whether each parameter is used in the condition of each policy on the screen in an identifiable manner.

(Supplementary Note 4)

The policy description assistance system according to Supplementary Note 3, wherein the association display unit is configured to display a policy of which condition is satisfied by the parameter on the screen in an identifiable manner.

(Supplementary Note 5)

The policy description assistance system according to Supplementary Note 4, wherein the association display unit is configured to display association between a policy and a parameter used by the policy so that the association is displayed in a first display mode when the condition of the policy is not satisfied, and the association is displayed in a second display mode different from the first display mode when the condition is satisfied.

(Supplementary Note 6)

A policy description assistance method for causing a computer to execute: referring to a parameter information storage unit that stores a plurality of parameters for a monitoring target system, and displaying the plurality of parameters on a screen of a display device; referring to a policy information storage unit that stores a plurality of policies in which a condition including at least one parameter of the plurality of parameters and a process executed when the condition is satisfied are described, displaying the plurality of policies on the screen, and adding or modifying a policy in the policy information storage unit according to a user input; dynamically determining association between the plurality of parameters stored in the parameter information storage unit and the plurality of policies stored in the policy information storage unit; and displaying the association between the plurality of parameters and the plurality of policies on the screen in an identifiable manner based on the determination results.

10: policy description assistance system
20: parameter storage unit
22: parameter information storage unit
24: policy analysis unit
26: policy information storage unit
28: association determining unit
30: determination result storage unit
32: input and output unit
40: parameter display unit
42: association display unit
44: policy display unit

I claim:

1. A policy description assistance system for communication with a display device and an input device, the policy description assistance system comprising:

a parameter information storage unit for storing parameters for a monitoring target system;

a parameter display unit configured to refer to the parameter information storage unit and display the parameters on a screen of the display device;

a policy information storage unit for storing policies in which a condition including at least one parameter of the parameters and a process executed when the condition is satisfied are described;

a policy display unit configured to refer to the policy information storage unit, the policy display unit displaying the policies with the condition and the process of each policy on the screen at a same time, and adding or modifying a policy in the policy information storage unit according to a user input received by the input device, each policy being displayed with the condition and the process of said each policy;

an association determining unit configured to dynamically determine whether each of the parameters satisfies the condition of a plurality of the policies; and an association display unit configured to display information indicating whether each of the parameters satisfies the condition of the plurality of the policies based on determination results of the association determining unit, wherein the association display unit is configured to display association between each of the parameters and the condition of the plurality of the policies so that the association is displayed in a first display mode when the condition of the plurality of policies is not satisfied, and the association is displayed in a second display mode different from the first display mode when the condition of the plurality of the policies is satisfied.

2. The policy description assistance system according to claim 1, wherein
the parameter display unit is further configured to add or modify a parameter in the parameter information storage unit according to a user input.

3. The policy description assistance system according to claim 1, wherein
the association display unit is configured to display whether each parameter is used in the condition of said each policy on the screen in an identifiable manner.

4. The policy description assistance system according to claim 3, wherein
the association display unit is configured to display a policy of which condition is satisfied by the parameter on the screen in an identifiable manner.

5. A policy description assistance method for causing a computer, that comprises a parameter information storage unit for storing parameters for a monitoring target system and a policy information storage unit for storing policies in which a condition including at least one parameter of the parameters and a process executed when the condition is satisfied are described, and is for communication with a display device and an input device, to execute:

referring to the parameter information storage unit and displaying the parameters on a screen of the display device;

referring to the policy information storage unit, displaying the policies with the condition and the process of each policy on the screen at a same time, and adding or modifying a policy in the policy information storage unit according to a user input received from the input device, each policy being displayed with the condition and the process of said each policy;

dynamically determining whether each of the parameters satisfies the condition of a plurality of the policies;

displaying information indicating whether each of the parameters satisfies the condition of the plurality of the policies based on the determination results; and displaying association between each of the parameters and the condition of the plurality of the policies so that the association is displayed in a first display mode when the condition of the plurality of policies is not satisfied, and the association is displayed in a second display mode different from the first display mode when the condition of the plurality of the policies is satisfied.

6. A policy description assistance device, comprising:

memory that stores parameters for a monitoring target system and stores policies, wherein each of the policies comprises a condition including at least one of the parameters and a process executed when the condition is satisfied; and a processor configured to:

control a display to display the parameters;

add or modify a policy stored in the memory according to a user input;

control the display to display the policies, each policy being displayed with the condition and the process of said each policy at a same time;

dynamically determine whether each of the parameters satisfies the condition of a plurality of the policies;

display information showing whether each of the parameters satisfies the condition of the plurality of policies; and display association between each of the parameters and the condition of the plurality of the policies so that the association is displayed in a first display mode when the condition of the plurality of policies is not satisfied, and the association is displayed in a second display mode different from the first display mode when the condition of the plurality of the policies is satisfied.

7. The device of claim 6, wherein the processor is further configured to modify a parameter according to a user input and provide a visual indication whether the modified parameter satisfies the condition of the plurality of the policies.

8. The system of claim 1, wherein the system is further configured to modify a parameter according to a user input and provide a visual indication whether the modified parameter satisfies the condition of the plurality of the policies.

* * * * *